(12) United States Patent
Ow

(10) Patent No.: US 11,645,405 B2
(45) Date of Patent: May 9, 2023

(54) SECURE FETCH OF DIGITAL CONTENT

(71) Applicant: Duvon Corporation, Las Vegas, NV (US)

(72) Inventor: Benedict Ow, Las Vegas, NV (US)

(73) Assignee: Duvon Corporation, Las Vegas, NV (US)

(*) Notice: Subject to any disclaimer, the term of this patent is extended or adjusted under 35 U.S.C. 154(b) by 289 days.

(21) Appl. No.: 17/039,796

(22) Filed: Sep. 30, 2020

(65) Prior Publication Data

US 2022/0100880 A1 Mar. 31, 2022

(51) Int. Cl.
| | |
|---|---|
| *H04L 29/06* | (2006.01) |
| *G06F 21/62* | (2013.01) |
| *G06F 21/10* | (2013.01) |
| *G06F 21/31* | (2013.01) |
| *G06F 21/60* | (2013.01) |
| *H04L 67/06* | (2022.01) |

(52) U.S. Cl.
CPC .......... *G06F 21/6218* (2013.01); *G06F 21/10* (2013.01); *G06F 21/31* (2013.01); *G06F 21/602* (2013.01); *H04L 67/06* (2013.01); *G06F 2221/2137* (2013.01); *G06F 2221/2141* (2013.01)

(58) Field of Classification Search
CPC ...... G06F 21/6218; G06F 21/10; G06F 21/31; G06F 21/602; G06F 2221/2137; G06F 2221/2141; H04L 67/06
See application file for complete search history.

(56) References Cited

U.S. PATENT DOCUMENTS

| | | | |
|---|---|---|---|
| 9,756,115 B2 | 9/2017 | Chan | |
| 9,792,452 B2 | 10/2017 | Tan | |
| 10,078,757 B2 | 9/2018 | Ow | |
| 10,275,609 B2 | 4/2019 | Ow | |
| 10,693,956 B1* | 6/2020 | Green | ................. H04L 65/4046 |
| 10,708,273 B2 | 7/2020 | Tan | |
| 11,250,142 B1* | 2/2022 | Wu | ....................... H04L 9/0819 |
| 2002/0120783 A1 | 8/2002 | Evgey | |
| 2002/0174010 A1 | 11/2002 | Rice, III | |
| 2003/0115144 A1 | 6/2003 | Stefik | |

(Continued)

FOREIGN PATENT DOCUMENTS

| | | |
|---|---|---|
| CN | 102930227 | 2/2020 |
| CN | 102609635 | 7/2020 |

OTHER PUBLICATIONS

Revolution Group, How to Securely Share Files in Microsoft OneDrive, Jun. 8, 2020, pp. 1-12, XP055845033, https://www.revolutiongroup.com/wp-content/uploads/HT-Securely-Share-Files-in-OneDrive-1.pdf (retrieved Sep. 27, 2021), section: "How to Share Files/Folders in OneDrive" (pp. 6-9).

(Continued)

*Primary Examiner* — Shin-Hon (Eric) Chen
(74) *Attorney, Agent, or Firm* — Lightbulb IP, LLC

(57) ABSTRACT

A Secure Fetch feature can be included with any file sharing or transfer service that allows access to files, folders and digital content where the party that is to gain access or possession of the materials (the requestor) desires to utilize an application that facilitates access or transfer of the materials and the party in possession of the materials (the requestee) is not required to log in to an application or even to download or open it.

12 Claims, 3 Drawing Sheets

(56) References Cited

U.S. PATENT DOCUMENTS

| | | |
|---|---|---|
| 2004/0002920 A1 | 1/2004 | Prohel |
| 2005/0081044 A1 | 4/2005 | Giles |
| 2005/0144195 A1 | 6/2005 | Hesselink |
| 2005/0234864 A1 | 10/2005 | Shapiro |
| 2006/0259957 A1 | 11/2006 | Tam |
| 2007/0118525 A1 | 5/2007 | Svendsen |
| 2008/0010457 A1 | 1/2008 | Lee |
| 2008/0147821 A1 | 6/2008 | Dietrich |
| 2008/0235795 A1 | 9/2008 | Ishikawa |
| 2008/0320397 A1 | 12/2008 | Do |
| 2009/0319172 A1 | 12/2009 | Almeida |
| 2010/0138396 A1 | 6/2010 | Kikkawa |
| 2010/0263053 A1 | 10/2010 | Catrein |
| 2011/0072264 A1 | 3/2011 | McNulty |
| 2012/0060072 A1 | 3/2012 | Simitci |
| 2012/0102429 A1 | 4/2012 | Naderi |
| 2012/0130857 A1 | 5/2012 | Thomas |
| 2012/0173655 A1 | 7/2012 | McEntee |
| 2012/0210134 A1 | 8/2012 | Mitter |
| 2012/0221636 A1 | 8/2012 | Surtani |
| 2012/0254746 A1 | 10/2012 | Avadhanam |
| 2013/0013798 A1 | 1/2013 | Grube |
| 2013/0067594 A1 | 3/2013 | Kantor |
| 2013/0091188 A1 | 4/2013 | Du |
| 2013/0185384 A1 | 7/2013 | Menon |
| 2013/0304866 A1 | 11/2013 | Wu |
| 2014/0074790 A1 | 3/2014 | Berman |
| 2014/0089419 A1 | 3/2014 | Morris |
| 2014/0089421 A1 | 3/2014 | Morris |
| 2014/0181354 A1 | 6/2014 | Yi |
| 2015/0006596 A1 | 1/2015 | Fukui |
| 2015/0242643 A1* | 8/2015 | Hankins, Jr. ............ H04L 63/04 726/26 |
| 2015/0341466 A1 | 11/2015 | Sah |
| 2015/0347765 A1* | 12/2015 | Hankins, Jr. ............ H04L 63/20 726/26 |
| 2016/0179618 A1 | 6/2016 | Resch |
| 2019/0278923 A1 | 9/2019 | Zhang |
| 2014/0040811 A1 | 2/2020 | Brahmanapalli |
| 2020/0285684 A1* | 9/2020 | Hälikkä ................ G06F 16/972 |
| 2013/0311597 A1 | 11/2020 | Arrouye |
| 2020/0356221 A1* | 11/2020 | Behzadi ............ H04M 1/72454 |

OTHER PUBLICATIONS

Salve Regina University, How to Use Microsoft OneDrive: Upload and Share Files, Mar. 31, 2020, XP055845021, https://salve.edu/sites/default/files/filefield/documents/onedrive_guide.pdf (retrieved Sep. 27, 2021), Part 2, "How to share files from OneDrive" (items 1-6).

* cited by examiner

SECURE FETCH OF DIGITAL CONTENT

BACKGROUND OF THE INVENTION

1. Field of the Invention

This invention relates to allowing access to files, folders and digital content where a party that requests access or possession of the materials (the requestor) desires to utilize an application that facilitates access or transfer of the materials and the party in possession of the materials (the requestee) is not required to log in to an application or even to download or open it. In particular, this invention relates to allowing a requestor to initiate allowance of access or transfer of materials using an application of the requestor's choice that offers the security, privacy, or other features desired without requiring the requestee to download, log in to, or have an account associated with the application.

2. Related Art

Existing file transfer and sharing mechanisms typically require users to subscribe to a service, to install special file transfer software, or both. While some services allow for the sharing or transfer of files to an individual without an account that has not installed special software, those services still require the individual that is in possession of the files to be shared or transferred to have an account with the service. "Secure Fetch" enables individuals outside of the file sharing system to transfer and share files and folders to users inside the file sharing system, without the need for an outside individual to install special software, join a server, or to otherwise sign up for a file sharing service.

Secure Fetch is intended to be used with any public cloud or digital content or file sharing application. In one preferred embodiment, the Secure Fetch capability is specifically configured to be used with the Pervasive Intermediate NAS Application (PINApp) set forth in U.S. Pat. No. 9,792,452, which is hereby incorporated by reference as if fully set forth herein, and may also be utilized with the PINApp Asynchronously Rendered Conduit (ARC) feature set forth in U.S. Pat. No. 10,708,273, which is also hereby incorporated by reference as if fully set forth herein.

PINApp is an efficient, cost effective and simple way for users to store and share their digital content using public cloud services, without the requirement to upload their digital content to the public cloud, and without the requirement to purchase an expensive "Network Attached Storage" (NAS) or "Personal Cloud Device" (PCD). Further, the PINApp negates the need for expensive cloud storage service subscription plans because digital content is stored on the user owned/managed device and not on the public cloud.

PINApp creates a digital environment wherein a user can store their digital content on a device they own (computer, smartphone, tablet, etc.) and both access and share that digital content through a public cloud service without the need to upload the digital content to the cloud.

PINApp ARC allows digital content to be accessed by connected devices (via PINApp) and also to be accessed by non-connected devices residing outside the PINApp system, using a profile managed by the owner of the content that allows the owner to maintain control over it.

SUMMARY OF THE INVENTION

Current known in the art file sharing and transfer systems require a user wishing to transfer or share a file, folder or other digital content to sign up for a service and install special file sharing or transfer software to enable the transfer or sharing of files, folders and other digital content that is commonly managed through computer and digital content storage systems. While these systems perform the related functions, the requirement to subscribe to, or otherwise join a service is undesirable for some parties.

There remains a need for a user to have the capability of obtaining content from a second person who may not be registered as a user of the system in a secure manner. That is, it may be that an individual is vigilant about where they store their own files and how they share them with others. For example, instead of using a public cloud for file storage and sharing, an individual may utilize a method that meets their security needs to do so. For example, a user may utilize PINApp, which allows for files to be shared without a requirement that they ever be uploaded to or stored on a public cloud, and is thus more secure than other competing file sharing or transfer services. However, even if an individual routinely uses secure methods to transfer files, when the same individual desires to receive files from another, the individual may depend on the other person's file sharing or transfer methods, which may not have the desired security or may be lacking in some other manner.

If a user desires to obtain digital content from another individual, and the user desires to maintain a high level of privacy for that digital content, the user is often limited to the desire and capability of the other individual to maintain the same level of privacy. For example, the information being transmitted may be more valuable to the user than to the individual, or the individual may not be a person that is sophisticated enough with technology to understand the risk associated with transmitting private information. Or, the user may be legally or otherwise responsible for the privacy and security of the individual's private information. In present systems, ensuring an acceptable level of privacy may require the individual to sign up for an account with a service that will facilitate it, an extra step that the individual may not be motivated enough to or easily capable of doing.

In instances such as in the legal and medical professions, it is often the case that clients and patients are requested to provide private information in written form that often ends up being supplied to the requesting business through means such as email attachments, or by installing a file transfer application on their computing device. In other instances, clients or patients may be requested to send information via a common file sharing application that has less than desirable security. Thus, while such methods perform the required function of transferring a file, folder or other digital content to the subject requester of the file, they are often lacking in security (such as an email attachment) or require the person submitting the file to install additional software or take other steps to provide the necessary file to the requester.

Therefore, a need exists to facilitate a file, folder and/or digital content transfer capability that negates the need for the obligated party (the party providing the requested content) to take extra steps in order to provide the requested digital content.

The devices, features, and functions described herein are intended to disclose a system and method to allow the transfer of digital content such as a file, folder or other media from a file owner to one or more recipients without the need for the file owner to install special software, join a transfer service or use email attachments in order to facilitate the requested file transfer.

The present invention addresses the need for a user to easily obtain digital content from an individual in a manner such that the user will ensure privacy and security of the digital content and the individual will need to take as little action as possible, even if the individual is not a user or does not have an account with the system that the user has selected to facilitate the sharing of the digital content.

Secure Fetch is a system and method that enables a file requester such as a business or enterprise to send a request (via email as an example) for a file to a non-affiliated party that enables that party to load the requested file to an embedded link contained in the email by either launching the link in a web browser or dragging and dropping the requested file directly into the link contained in the email.

Secure Fetch is particularly well suited to enable the transfer of files, folders and digital content from non-affiliated parties to business and enterprise interests such as medical, legal and other related disciplines wherein digital content is shared by the non-affiliated party to the respective business or enterprise. By allowing clients of businesses such as medical and legal professionals to share their digital content without the need to install, employ or otherwise utilize a file sharing or transfer service or application, Secure Fetch simplifies the process of file transfer for those that do not otherwise have a file transfer service. Further, by eliminating the need to send an email attachment of sensitive or proprietary information (such as legal and medical records), Secure Fetch creates a temporary and secure environment in which to transfer files from a non-affiliated party to a file requester.

In a preferred embodiment, Secure Fetch is a feature that is included with a secure file sharing and transfer application such as the PINApp. The PINApp, as it presently exists, enables a user of a computing device (personal computer, smartphone, tablet, etc.) to designate a digital storage repository (file, folder, USB stick or other connected internal or external drive) to connect to the public cloud for the purpose of sharing their digital content. In one preferred embodiment, the PINApp may be downloaded and installed on a personal computing device such as a smartphone or a tablet, and be used to allow the owner of the smartphone or tablet to share their photos with another person. The PINApp negates the need for the user to email or otherwise transfer their photos to the cloud, and enables them to share the photos directly with friends and family from their device using existing cloud storage and sharing services. By allowing users to share their digital content directly from their device, the PINApp negates the need for users to purchase expensive Local Area Network (LAN) connected Personal Cloud Devices (PCDs) or to subscribe to expensive cloud services. The PINApp allows the user to utilize the storage space on their computing device (or otherwise connected to their device such as an external hard drive) instead of the cloud or PCD storage space, saving upload time and the cost associated with paying for online (cloud) storage space or Network Attached Storage (NAS) devices and other "personal cloud" type devices. This also allows the user to control the privacy and security of the user's materials, rather than uploading them to storage space where privacy and security may be compromised, either by the terms of service of the space, or by virtue of the space being less secure than a device that the user controls.

The PINApp also allows a user to digitally assign (or pin) a folder that is hosted on their computing device directly to the public cloud. This "pinned" folder enables the user to place digital content into the folder to be accessed and shared directly through the public cloud, negating the need for a designated PCD or NAS device. The digital content that is stored in the pinned folder can be shared with one or more recipients through a publicly available cloud storage provider, but will remain on the local device, ensuring both privacy and security of the digital content. By allowing the digital content to be stored locally and not uploaded to the cloud, the PINApp bypasses expensive cloud storage service agreements because the PINApp negates the need to utilize the cloud service provider storage space. All of the digital content is stored on the device of the user/owner initiating the PINApp. PINApp is more fully described in U.S. Pat. No. 9,792,452, which is hereby incorporated by reference as if fully set forth herein.

PINApp ARC, as it presently exists, allows digital content to be accessed by connected devices (via PINApp) and also to be accessed by non-connected devices residing outside the PINApp system, using a profile managed by the owner of the content that allows the owner to maintain control over it. PINApp ARC allows a digital content owner to create a profile that will determine the usage parameters that govern a piece of digital content such as a file, or a group of digital content such as a folder or the contents of an entire server or drive. The ARC profile contains information such as what file(s) are being managed through the ARC, what access rights are assigned to each individual user or groups of users, if the digital content usage will expire or lapse over time, and if the digital content may be moved from an original host location to a secondary location, or even a third-party location. PINApp ARC is more fully described in U.S. Pat. No. 10,708,273, which is also hereby incorporated by reference as if fully set forth herein.

However, in the existing PINApp and PINApp ARC, content can only be provided by a user of the system, which requires the user to have an account and to utilize PINApp software.

In a preferred embodiment of Secure Fetch, it is utilized with PINApp such that an individual can pin a folder with digital content that the individual desires to share or transfer even though the individual does not have an account with PINApp, has not downloaded or installed any of the PINApp software, and has not downloaded any other file transfer software. This could be facilitated by an individual that does have a PINApp account who sends a link to the individual (who is not a PINApp user) that allows that individual to pin their content, making it accessible to others, such as the PINApp user that facilitated the pin.

In another preferred embodiment, Secure Fetch is utilized with PINApp ARC, such that a profile for content that is to be accessed or shared can be created by a PINApp user, where the content itself that will be subject to the profile is able to be provided by an individual that is not a PINApp user and has not downloaded PINApp software.

In a preferred embodiment, the system provides a Secure Fetch capability that enables the ARC to be used to allow a non-affiliated party (a person that is not a registered user of the system) to transfer or otherwise share files and/or folders using an ARC profile (in the context of Secure Fetch, an ARC profile may be more specifically referred to as a Secure Fetch profile) created by an affiliated party. More specifically, Secure Fetch enables an empty ARC (Secure Fetch) profile to be created by a user with system access (referred to herein as a requestor) that can be sent to a non-affiliated party (referred to herein as a requestee), and populated with files, folders and other digital content before then being sent to an end recipient (as designated by the creator of the ARC profile, the requestor) of the content. The purpose of this is to expand the capabilities of the ARC to include use by persons outside the system, but with the need to privately and securely share digital content with persons that are registered to the system.

The ARC allows one or more profiles to be created by a requestor, who is an ARC user, and then sent to one or more requestees to add one or more files, folders or digital content. That is, the Secure Fetch profile is created for the purpose of enabling a requestor to send an empty Secure Fetch profile to a requestee, allowing the requestee to populate the Secure Fetch profile with digital content such as files, folders, pictures, videos and the like. The completed Secure Fetch profile is then returned to the requestor, and/or to one or more third parties that are to be granted access to the digital content as designated by the user creating the Secure Fetch profile (those granted access are referred to herein as grantees). In some embodiments, each Secure Fetch profile can contain one or more pieces of digital content (files, folders and the like) and can be destined for return to the requestor (who created the Secure Fetch profile), or one or more grantees as designated by the requestor (who created the Secure Fetch profile). Further, a single profile can be created and sent to multiple requestees (content owners) so that the content can be populated by the multiple requestees (content owners), and then sent to the requestor who created the Secure Fetch profile, and/or to one or more grantees as designated by the requestor (who created the Secure Fetch profile). In an alternative embodiment, a requestee may also identify grantees.

From the discussion that follows, it will become apparent that the present invention addresses the deficiencies associated with the prior art while providing additional advantages and benefits not contemplated or possible with prior art constructions.

Other systems, methods, features and advantages of the Secure Fetch capability will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

The functional elements of the Secure Fetch system and method will now be discussed with reference to FIG. 1. Please note that while other functional elements exist within the system, this disclosure focuses on the primary and preferred embodiments of Secure Fetch. It would be obvious to one skilled in the art to alter or otherwise modify the disclosed elements to change functional aspects of Secure Fetch. Please also note that a party receiving a Secure Fetch share link to be populated with digital content is referred to in the discussion that follows as a "requestee." This is the party who will be providing the digital content being requested by a "requestor" via the Secure Fetch system and method.

Figure 1:
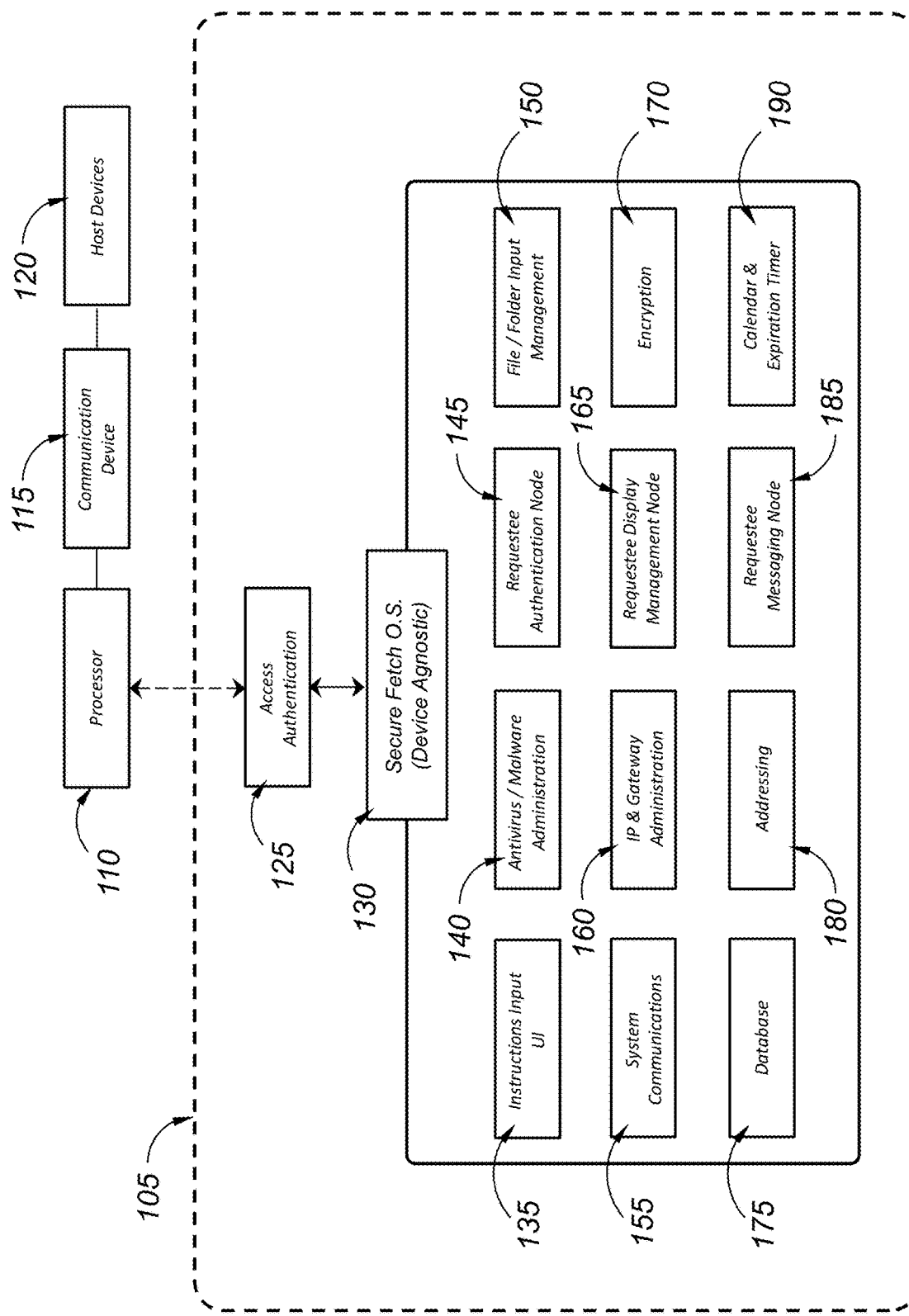
FIG. 1 is a block diagram, depicting the general flow of the Secure Fetch functionality.

As can be seen in FIG. 1, the Secure Fetch 105 is intended to be deployed within a computing system that provides a processor 110, a communication device 115 and additional host devices 120 that can include (but are not limited to) storage repositories such as local drives, USB drives, internal and external storage drives, servers and other computing devices capable of storing digital content and communicating through networks with other computing devices.

Secure Fetch 105 provides an access authentication 125 function that works in conjunction with the host system to enable a requestor to access the Secure Fetch 105 system. Access authentication 125 may include (but is not limited to) the use of a username and password, multifactor authentication and other known in the art access and authentication methodologies. Once access to the Secure Fetch 105 system through the access authentication 125 is complete, the requestor will enter the Secure Fetch operating system 130. The Secure Fetch operating system 130 controls all functional elements of the Secure Fetch 105 system. These functional elements include (but are not limited to) the instructions input user interface 135 that provides a graphical interface (not pictured) to be used by the requestor (not pictured) to navigate the functions and controls of the Secure Fetch 105 system; the antivirus and antimalware administration 140 function that governs the usage and application of antivirus and antimalware elements within the system; an authentication function 145 that enables the requestor/provisioner of the Secure Fetch 105 to apply, if desirable, requestee and/or grantee authentication methods such as username and password protection or a PIN, multifactor authentication and other functional elements governing access to the system by a requestee or a grantee; a file and folder input management 150 function that governs the use of content to be provided by a requestee (which may be one requestee or multiple requestees); and a system communications 155 function that administrates all communications from the Secure Fetch 105 to the host system being managed by the processor 110. The system communications 155 additionally provides notifications and messaging from other system sources such as memory allocation messages, error and confirmation messages and the like; an IP gateway administration 160 function that enables a requestor of the Secure Fetch 105 system to enable or disable receipt of digital content such as files and folders from specific IP addresses; a requestee display management 165 function that governs the user interface for requestee devices such as a computer, smart phone, tablet or other known in the art computing devices; an encryption function 170 that allows a requestee to choose to encrypt the digital content (files, folders, etc.) they wish to share to the user of the Secure Fetch 105 system; a database 175 that works in conjunction with the host system managed by processor 110 to store information including (but not limited to) requestor and, where desirable, requestee and/or grantee login information, files and folders transferred into and out of the Secure Fetch 105 system, device and IP addressing and MAC code information and the like; a requestee messaging function 185 that enables a requestee to create and send messages to, for example, a requestor, through the Secure Fetch 105 system; and a calendar and expiration timer function that enables the requestee to manage the timeframe that the digital content they are sharing through the Secure Fetch system 105 will be made available. The requestor provisioning the Secure Fetch 105 system may choose to enable or disable any of the above functional elements contained within the Secure Fetch 105 system, based on the needs of the requestor. While not specifically pictured, the system also allows the requestor to perform these functions, including to send messages and to set an expiration timer.

As an example of functional elements of the Secure Fetch 105 system being enabled and disabled, Secure Fetch 105 may be deployed by a hospital or other medical provider. The requestee (a patient of the hospital in this example) of a Secure Fetch share link may be required to provide documentation from another medical provider to the subject hospital. The Secure Fetch 105 requestor (the hospital) may disable the calendar and expiration timer 190 to prevent the requestee (patient) from stopping the hospital from downloading or otherwise having permanent access to the documentation being requested from the requestee (patient). The system may be configured to allow a requestor to have any number of administrative functions to control the options that will be presented to a requestee.

Secure Fetch is intended to provide a seamless method to enable a requestee to provide files, folders and other digital content (as required) to the Secure Fetch requestor, while negating the need for the Secure Fetch requestee to utilize email attachments, cloud storage, file transfer apps or other extra steps that would otherwise be required to perform the transfer of digital content between computing devices, networks and realms.

Figure 2:
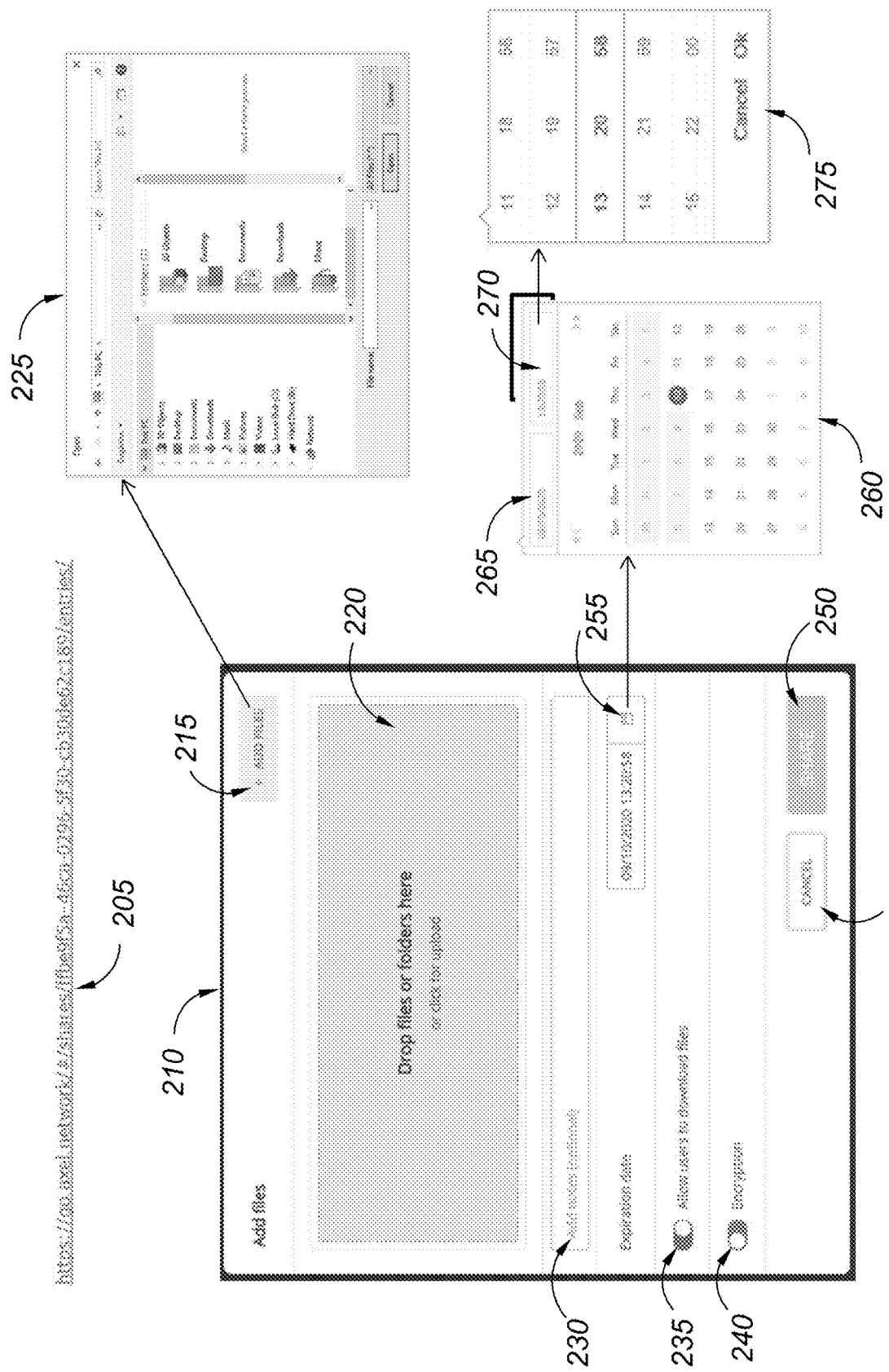
FIG. 2 is an illustration depicting a user interface that may be provided to a requestee when the Secure Fetch functionality is used.

With reference to FIG. 2, an example of the Secure Fetch from a requestee perspective will now be discussed. It is important to note that while other embodiments exist, the discussion has been limited to highlight the preferred embodiments and functional elements of the Secure Fetch function. Using the previous example, we will assume the hospital is the Secure Fetch requestor and the requestee is a patient of the subject hospital.

With reference to FIG. 2, the process begins by the hospital (requestor) sending a link 205 to a patient (requestee). This link can be provided through typical known in the art messaging applications such as email, text messaging, SMS messaging, chat programs and through digital content such as word documents, PDF documents and other commonly transmitted media methods. The patient may open the link 205 using a typical web browser or other system software capable of enabling communications from the patient computing device to a remote computing device such as a server, smart phone, laptop, tablet or other commonly known in the art systems.

Once the patient opens the provided link 205, a menu window 210 will open within the patient's computing device. As stated previously, this could be any commonly known device including a personal computer, smart phone, tablet or other. As can be seen in FIG. 2, the menu window allows the patient to add files by selecting the add files 215 option or by dragging and dropping 220 the files into the provided window. Selecting the add files 215 option will open an additional window 225 on the patient's computing device to allow them to select files and/or folders from their computing device using the host computing file management system as shown.

The patient may also add a note 230 (which would be visible to the Secure Fetch requestor and/or to another grantee that has been provided access to the uploaded digital content) should they choose to do so using the provided note 230 window. An expiration timer 255 may be set by the patient to govern how long access to the subject files will be available to the Secure Fetch user. As an example, a patient may decide to make the files available for a day, a week, a month, or indefinitely. By selecting the calendar 255 menu, a second window 260 opens, allowing the patient to select a date in which a shared file will no longer be available. An expiration time 270 may also be set by selecting the time 270 window shown in FIG. 2. This selection will bring up an additional window 275 which allows the patient to provision the exact time which a share will expire. The window 275 shows a 24-hour clock. It is noted that the clock can be displayed in any configuration, as can the calendar 255 function. In addition, the system may be configured to allow the requestee to set a limited number of times the shared content can be accessed. For example, if the information to be shared is considered highly sensitive, the requestee might elect to only allow a single viewing of the content before the share is disabled. As discussed above, the system may be configured to allow the requestor, in this case, the hospital, to disable the requestee's ability to set an expiration timer or to change the other options provided as examples in this figure such as notes, encryption, and download control. As also discussed, the requestor might also choose to set encryption, download control, or expiration on its own. The system may be configured to present these selections to the requestee in the user interface to make the requestee aware of the security level that will be implemented with the share. Note that it is contemplated that in some instances it may be desirable for one or more grantees to have access to the content provided while the requestor does not. For example, a hospital staff member could be instructed to set up the Secure Fetch and could act as a requestor while a doctor or insurance entity may be a grantee. In this instance, it may be beneficial for a requestor not to have access to the digital content, which may be of a sensitive nature. As another example, in a legal context, a staff member at a law office may serve as a requestor to facilitate the sharing of sensitive information between an attorney or a client, or two attorneys, which parties can be identified as requestees and grantees as appropriate for the circumstances.

With continued reference to FIG. 2, a patient may also choose to prevent or allow download 235 of a file, folder or other digital content shared through Secure Fetch. As an example, a patient may choose to make a document such as a driver license or passport shared through the system as "view only." By selecting the download 235 toggle, the patient may prevent the download, causing the shared file to be visible to the Secure Fetch requestor, but not downloadable. This selection can be changed by the patient at any time during the share duration as determined by the calendar 255 and timer 270 functions. As with the expiration timer, the system may be configured to allow the requestor to disable the requestee's option of choosing whether the content can be downloaded.

The patient can also choose to encrypt 240 files that are being shared to the Secure Fetch requestor (the hospital). This will protect the files and folders while in transit and in storage at the Secure Fetch requestor (hospital) location. The hospital itself will govern the encryption and be able to unlock any file encrypted through the use of the Secure Fetch. The encryption is intended to provide an added layer of protection for the patient during file transit and storage.

Once the patient has completed their file and folder sharing selections and affected all of the attributes of the share, they can then select the share 250 function to complete the transaction. Selecting cancel 245 will cancel all settings and provisions enabled by the patient which would effectively terminate the Secure Fetch session. The session may be reopened by the patient by selecting the link 205 that was used to enable the Secure Fetch session. It is understood that the hospital can withdraw or otherwise disable the link 205 to the Secure Fetch session at any time.

While this is one example, Secure Fetch may be configured with additional options and features. For example, a requestor may actually be more than one user, thus allowing multiple users to act as requestors and to set up a Secure Fetch. A requestor also may be permitted to send a Secure Fetch link 205 to multiple requestees at once. In the hospital example, the hospital may desire to send a Secure Fetch to both parents of a minor child patient so that they can each upload documents. In addition, the requestor may desire that other parties in addition to, or even instead of, the requestor shall have access to the material provided by the requestee(s). In the hospital example, the hospital could organize the Secure Fetch but it may be beneficial to make the uploaded documents available to other doctors or perhaps a health insurance entity. It may be, for example, that a requestor sends a Secure Fetch link 205 to three requestees, and also makes whatever material that is provided by those requestees available to other parties (grantees), who, in this example, are also not required to have accounts or have downloaded the software for the file sharing and transfer system. In a preferred embodiment, only the requestor that creates the Secure Fetch profile is required to have an account with the system and/or to be running the application.

In another embodiment, the Secure Fetch functionality can be used with PINApp. For example, a requestee may "pin" a file to be provided instead of transferring it. In this instance, access to the file would be via the pinned file, and the file itself would not move. In such an embodiment, the requestor could select an option to either allow or require a requestee to pin a file. Other options, including those previously mentioned, could also be included, such as whether the requestor or the requestee selects whether a party that is to have access to the content (which could be the requestor or one or more other grantees) can download it. In a preferred embodiment, the requestee would not need to have a PINApp account or to have downloaded PINApp software in order to pin a file. Instead, a requestor that set up the Secure Fetch could give access to PINApp functionality to the requestee through the requestor's PINApp account. It is important to note that, throughout this description, whenever a requestee populates a Secure Fetch link 205, such as by providing their content via the same, it is assumed that the requestee could pin the material to facilitate sharing or transferring it. Thus, Secure Fetch can work both by actually transferring a copy of the digital content that is to be shared or by granting access to that digital content while the digital content never moves from the requestee's device.

In another embodiment, the Secure Fetch functionality can be used with PINApp ARC. In this embodiment, an ARC profile (which may, in this context, be called a Secure Fetch profile) may be created that does not contain a file, folder or other digital content, but instead may be sent to a requestee to allow the requestee to add one or more files or folders to a Secure Fetch profile to enable the content to be safely delivered to the requestor that created the Secure Fetch profile (or to other grantees identified by the requestor).

The ARC system enables the creation of a digital access profile to govern the usage of digital content managed and/or protected by the ARC. The ARC works by taking the access and usage input and creating a digital access profile to govern how the subject digital content is utilized, accessed, stored, managed, forwarded and/or engaged by a recipient party(s).

A Secure Fetch profile utilizing ARC functions like an ARC profile. A Secure Fetch profile contains all elements of the digital content being managed in addition to all the control parameters designated by the profile creator. The ARC takes these elements and creates a single, easily transported digital content format (or profile) to carry the host content and control information across devices, networks, domains, and between one or more parties. The ARC also contains encryption, expiration, display, and messaging information required to enable both PINApp and non-PINApp requestees to access subject digital content.

Based on the parameters set, the ARC may allow digital content to be passed between devices, networks, and domains, or may require a requestor or grantee to access the digital content directly from a requestee's host location within a host system (such as PINApp). Like other embodiments discussed above, these parameters may be set by a requestor, or, if the requestor elects to provide a requestee with options, by a requestee. The ARC may be utilized to enable a requestor to take control and/or receive a digital copy of the requestee's original content for the purpose of storing a back-up or creating a "spare." The digital content may require enhanced security restrictions, wherein the requestor (or another grantee) may not take ownership of the digital content, but rather be able to view the content in the host location that the requestee has selected. By allowing the requestor that created a profile, and, as allowed by that requestor, the requestee, to maintain control of content that may be accessed by other parties, the ARC aligns with regulations and controls such as HIPAA and other regulations that govern the management of very personal and private digital content such as patient records, legal documents, and the like.

As an example of the use of Secure Fetch with ARC, a requestor may create a Secure Fetch profile and pass that profile to a requestee. The requestee (not affiliated with the PINApp and/or ARC system) may then add one or more files or folders to the subject Secure Fetch profile, and return the Secure Fetch profile to the requestor. By enabling people not affiliated with the subject systems to safely and securely transfer files to participants of the system, the usability of the PINApp and ARC systems are expanded, enabling simple access to parties that are both affiliated and not affiliated with the system.

As with any ARC profile created, access to the content in a Secure Fetch profile is discretionary and dependent upon the needs of the creator of the profile (the requestor), or, if configured by that requestor, the requestee. Specifically, the requestor may designate him/herself as having access to the content in a Secure Fetch profile being populated with one or more files and folders by a non-affiliated party, or may designate a third-party grantee to be permitted to access the content being supplied to the profile by the non-affiliated requestee.

As an example of the above, a requestor creates a Secure Fetch profile to be populated with files and/or folders provided by a requestee. As with the previous example, the requestee is not affiliated with the PINApp system and may not otherwise create an ARC or Secure Fetch profile. The requestor may designate a grantee as the recipient of the Secure Fetch profile being populated with the subject files and/or folders by the requestee. As the requestee populates and then sends the populated Secure Fetch profile, it will arrive at the grantee and may not be redirected by the requestee or the grantee unless otherwise provisioned for by the requestor (creator of the Secure Fetch profile). This allows the provisioner/creator of the Secure Fetch profile to direct the content and manage it to ensure privacy, security and ultimate control over the delivery of the subject content. This is particularly important in instances wherein delicate and confidential content such as medical/patient records are being managed through healthcare administrators or the like.

In another preferred embodiment, the Secure Fetch profile may be populated with files/folders or other content by multiple requestees prior to being returned/sent to the requestor or other grantees selected by the requestor (or the requestee) to receive access to the content itself. As with the above examples, a Secure Fetch profile may be created by a requestor with access and controls necessary for the creation of the subject Secure Fetch profile. The Secure Fetch profile may then be sent to multiple requestees to have content added, and then sent to one or more grantees selected by the requestor to receive access to the subject content. This may be done utilizing a single Secure Fetch profile, or multiple Secure Fetch profiles, depending entirely upon the configuration that the requestor generating the Secure Fetch profile chooses. Specifically, a single Secure Fetch profile may be created and sent to multiple requestees, enabling each of them to add content and forward the profile on until it reaches the grantees, or multiple Secure Fetch profiles may be created and sent to each requestee separately to be populated with the subject files, folders and digital content, and then sent directly to the grantees. Again, this configuration is determined by the needs of the person(s) creating the Secure Fetch profile.

Figure 3:
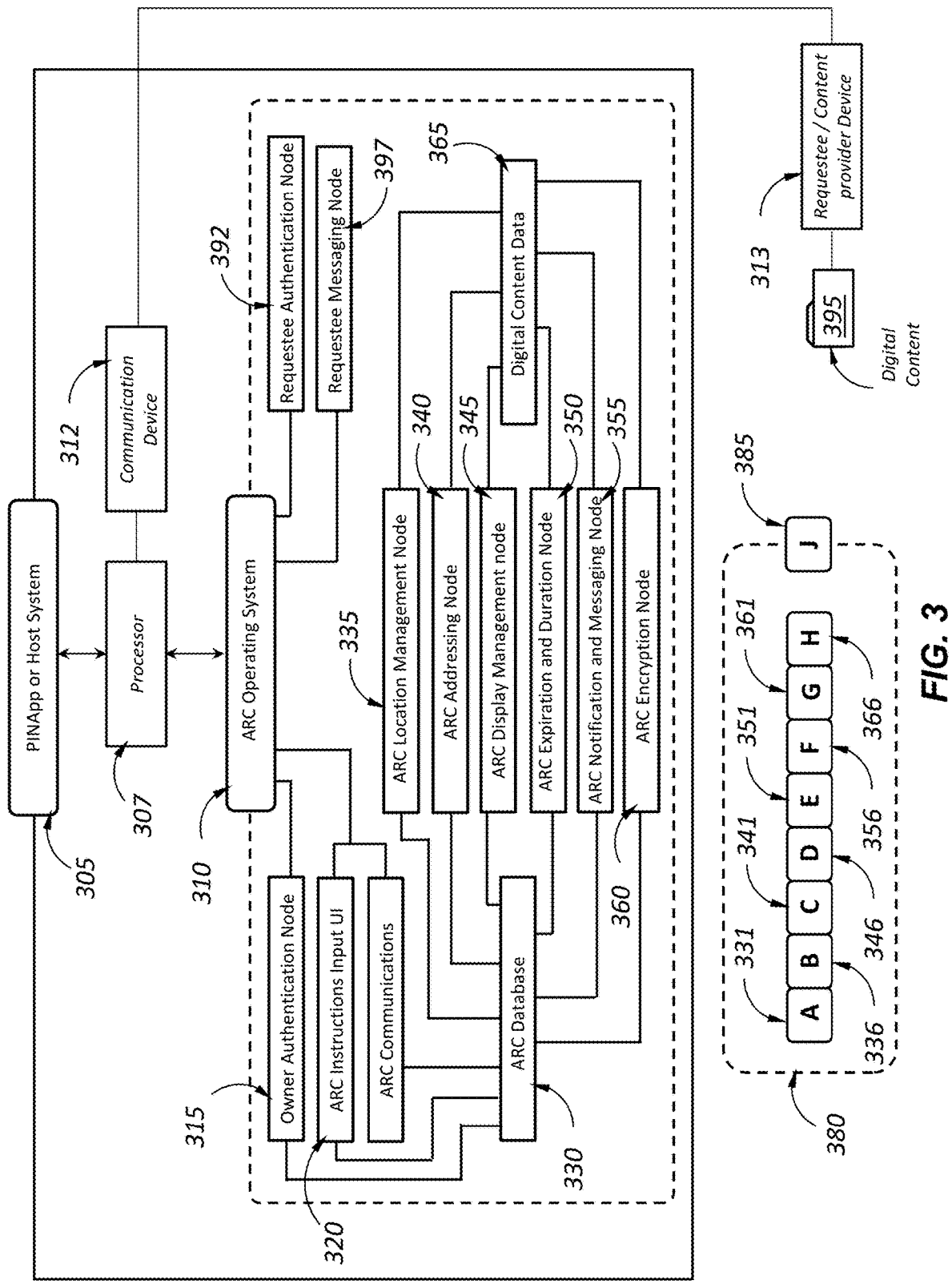
FIG. 3 is a flow diagram illustrating the creation of a Secure Fetch Profile using Secure Fetch with the PINApp ARC.

Another example of the Secure Fetch will now be discussed with reference to FIG. 3. It is important to note that while other embodiments exist, the discussion has been limited to highlight the preferred embodiments and functional elements of the Secure Fetch function. FIG. 3 assumes that the requestor creating the Secure Fetch (empty ARC profile) has already logged into their account and given access to the ARC functions. A requestee of the Secure Fetch who is intended to populate it with digital content (files, folders or other) is not a user of the ARC system and does not have access to the functional elements contained therein.

As a brief recap of the system components utilized to generate and share a Secure Fetch (empty ARC profile), and with reference to FIG. 3, the top section of the diagram illustrates the PINApp or host system 305 engaging a processor 307 to facilitate operations between the PINApp or host system 305 and the ARC operating system 310. The processor 307 is also connected to a communication device 312 such as a wired or wireless network or other interface allowing external communications to external devices such as smart phones, computers, tablets or other computing devices capable of communicating over a network. The lower section of FIG. 3 illustrates the modules (A through J) that make up the Secure Fetch profile 380. For the purpose of easing understanding of the Secure Fetch profile creation, the modules (A through J) represent specific functional elements and attributes assigned to digital content being added to the Secure Fetch and subsequently being managed by the Secure Fetch profile 380. The quantity of controls and restrictions in this example (with reference to FIG. 3) are limited to ease understanding of the creation of the Secure Fetch profile 380. It will become obvious to one skilled in the art that a virtually limitless set of control aspects may be attached to create a Secure Fetch profile. The example referenced in FIG. 3 is not intended to limit the scope of the Secure Fetch profile 380, or the creation thereof.

Creation of the Secure Fetch profile 380 begins with a user of the ARC and PINApp host system, a requestor (not shown), logging into the host (PINApp 305) system, and subsequently the ARC operating system 310 through the owner authentication node 315. The owner authentication node 315 works in conjunction with the ARC database 330 as well as the host system (PINApp 305) to ensure the identity of the requestor wishing to access the ARC. FIG. 3 assumes the identification information for the requestor in the PINApp or host system 305 database (not shown) matches the identification information stored in the ARC database 330, which subsequently allows the requestor (not shown) to access the ARC system.

Now that the identity of the requestor (not shown) is validated by the ARC operating system 310 and the PINApp or host system 305, the requestor (not shown) can begin creating a Secure Fetch profile 380. Since the profile will be empty by default, no file selection will be made at this time, as the files, folders and other digital content 395 will be supplied by the requestee/content provider 313.

The requestor (not shown) will access the ARC instructions input UI 320 and designate that the content will be populated by one or more requestees/content providers 313. It is important to note that the Secure Fetch profile 380 may or may not specifically contain a copy of the digital content 395 that will be referenced. ARC provides the capability of enabling the transport (through the Secure Fetch Profile) of one or more files and/or folders or other digital content, or may be configured to provide a physical location of the subject digital content. This determination is made based on the needs of the user creating the Secure Fetch profile, or if the requestor desires, by the requestee. As the requestee/content provider 313 populates the Secure Fetch profile 380 with the subject digital content 395 (via a physical address to the content or by providing the content itself), the ARC operating system 310 will update the ARC database 330 about the location and attributes of the digital content 395 being referenced by the Secure Fetch profile 380.

Once the ARC database 330 has stored the file name, file size, file type and has verified the physical location of the subject digital content file 395, it will notify the ARC location management node 335 to attach the associated digital content data 365 to the new Secure Fetch profile 380 being generated. Again, the digital content file 395 itself may be physically added to the Secure Fetch 380 profile, or may be referenced through addressing schemes that provide the physical location of the digital content 395 so that it may be retrieved.

The digital content data 365 being attached to the Secure Fetch profile may be the file name, file type, file size and location data, allowing the ARC to validate the location and establish a link between the digital content itself (the video file) and the Secure Fetch profile, or may be the physical digital content 395 itself. In instances where the location of the digital content 395 is being used, the ARC location management node 335 will continuously track the location of the digital content file 395 and keep the ARC database 330 updated as to the current location to ensure the integrity of all ARC profiles (including 380) associated with the subject digital content file 395, provided the requestor 313 has given permissions to do so.

The digital content data 365 (e.g., file name, file type, file size, etc.) is now added to a newly generated Secure Fetch profile 380 as represented by block-A 331. Now that the requestee/content provider 313 has provided access to the digital content 395 the digital content 395 will be governed by attributes selected by the requestor (not shown) who created the Secure Fetch profile 380. Again, please note that block-A 331 now contains information relating to the digital content 395 that is now being managed through the Secure Fetch profile 380. The requestor (not shown) who created the Secure Fetch profile 380 can identify grantees that are to receive access to the subject digital content 395, now being managed by block-A 331 for inclusion in the Secure Fetch profile 380.

For the purpose of this example with reference to FIG. 3, information concerning the identity of grantees that are to receive access to the digital content hosted by the Secure Fetch profile and managed through the ARC will be configured based on the host system (PINApp 305) user database information. In instances where the ARC is deployed as a stand-alone management tool, the identification information of grantees will be entered into the ARC system and stored in the ARC database 330.

With reference to FIG. 3, the ARC addressing node 340 manages the addressing of the grantees to control access to the contents (digital content data 365) managed within the Secure Fetch profile 380. The requestor (not shown) will enter an identifier into the ARC instructions input UI 320 (in this example, an employee ID number) to indicate the grantees who will be given access to the subject digital content file 395 managed within the Secure Fetch profile 380. The ARC database 330 will record the identifier information of the grantees for future retention and to ensure the integrity of the Secure Fetch profile 380 being created. The addressing information of the grantees will be stored within the newly created ARC profile 380 as block-C 341.

The next component for creation of the profile will be the display and rendering information (created by the ARC display management node 345) for the digital content file 395. Since the digital content file 395 is a video, the ARC display management node 345 will provide criteria such as screen formatting, color composition, file playback formatting, and the like. Engaging with the ARC instructions input UI 320, the requestor notes that the digital content file 395 is an MP4-type file.

While the ARC can manage a virtually unlimited number of digital content formats, the MP4 designation is used to ease explanation of the creation of the Secure Fetch profile 380. As the MP4 designation is selected, the ARC instructions input UI 320 shares this information with the ARC database 330, which subsequently stores it with reference to the subject Secure Fetch profile 380 being created. The ARC database 330 instructs the ARC display management node 345 to provision the Secure Fetch profile 380 to render and/or display the digital content file 395 (video file) as an MP4 file. The ARC display management node 345 adds the display and content formatting information (MP4) to the Secure Fetch profile 380 being created. The MP4 and other display and rendering information created is stored as block-D 346 within the Secure Fetch profile 380.

The next step in the creation of the Secure Fetch profile 380 (with continued reference to FIG. 3) is the expiration and/or usage duration of the digital content file 395, which is controlled by the ARC expiration and duration node 350. To ease explanation and understanding of the functional aspects of the ARC, this discussion assumes the digital content file 395 will be available to the grantees for an indefinite period of time, and an indefinite number of usages. The ARC is capable of allowing the requestor (or, if the requestor allows, the requestee) to put specific usage numbers and/or expiration dates and times on digital content being managed through the ARC.

In this example, the requestor creating the Secure Fetch profile 380 (not shown), through the ARC instructions input UI 320 enters "never expire" as the expiration date and the number of uses at "infinite" for the digital content file 395. The ARC instructions input UI 320 shares this command information with the ARC database 330. The ARC database 330 stores the expiration and usage criteria for the Secure Fetch profile 380 and instructs the ARC expiration and duration node 350 to set the digital content file 395 to never expire, and to allow infinite uses. These usage and duration parameters are stored as block-E 351 of the Secure Fetch profile 380. Please note that the Secure Fetch profile 380 data as individual blocks of data (blocks A through J) as well as the completed profile 380 itself are stored within the ARC database 330.

The next step in the creation of the Secure Fetch profile 380 is the option to create a personalized message to accompany the digital content file 395 that can be managed and/or transferred to, for example, a grantee, through the ARC. The ARC notification and messaging node 355 is provided to enable the creation of personalized messages as well as to manage any communication between a requestor, requestee, and grantee, or to manage any ARC system level notifications that need to be shared with a requestor, requestee, or grantee. In addition to personal messages from the requestor creating the Secure Fetch profile 380 to a requestee, which might include, for example, requests for specific digital content, messages that can be generated through the ARC notification and messaging node 355 can include (but are not limited to) notifying a requestor and/or grantee when access to the digital content has been enabled. Other messages that can be generated could notify the requestor and/or the requestee when the Secure Fetch profile is accessed by one or more other parties that have been granted access to the digital content stored in the Secure Fetch profile, or the number of times the digital content file is accessed. Messages could also be generated related to any confirmation and/or error messages being communicated from the ARC operating system 310 to the PINApp or host system 305, and the like.

For the purpose of this example (with continued reference to FIG. 3), the requestor (not shown) creating the Secure Fetch profile 380 could include a message stating "here are Mr. Smith's medical records." The requestor (not shown) creating the Secure Fetch profile 380 will enter the reference message into the ARC instructions input UI 320. The message will then be transferred to the ARC database 330 for storage. The ARC database 330 will engage the ARC notification and messaging node 355, providing instructions to attach the subject message ("here are Mr. Smith's medical records") to the digital content file 395. The messaging information provided from the ARC notification and messaging node 355 is thus associated to the digital content file 395 and can, if the requestor has selected, be shared to the grantees. The messaging information is then added to the Secure Fetch profile 380 as block-F 356. As is the case with all Secure Fetch profile 380 information, the ARC database 330 will host both the individual elements (blocks A through J) that make up the Secure Fetch profile 380, as well as the completed Secure Fetch profile 380.

The next step in the creation of the Secure Fetch profile 380 (with continued reference to FIG. 3) is the addition of encryption to protect the digital content data 365 and the Secure Fetch profile 380. Through the ARC instructions input UI 320, the Secure Fetch profile 380 creator (not pictured) will select the appropriate encryption to protect the subject Secure Fetch profile 380. Encryption methodologies may be dictated by the host system (PINApp 305) or may be dictated by the ARC operating system 310, should the ARC be deployed as a stand-alone digital content management tool.

For the purpose of this example, we will assume the requestor (not shown) creating the Secure Fetch profile 380 wishes to employ 2-factor (pin and token) authentication to the subject Secure Fetch profile 380. From the ARC instructions input UI 320, the digital content owner will select 2-factor authentication. The selection is passed to the ARC database 330 for storage. The ARC database 330 will then engage the ARC encryption node 360 and set the encryption parameters for the digital content data 365 to 2-factor authentication. The 2-factor authentication information is attached to the Secure Fetch profile 380 as block-G 361.

As with all control parameters added to the Secure Fetch profile 380, the ARC database 330 will store the completed Secure Fetch profile 380 blocks-A through J for future retention, and to ensure the integrity of each Secure Fetch profile 380 being created. Block-H 366 represents the ARC database 330 information for the subject Secure Fetch profile 380. The ARC database 330 information contained in Block-H 366 includes (but is not limited to) a summary of all blocks thus far (A through G) in addition to the digital content owner identification information, a summary overview of the digital content file 395 being managed through the Secure Fetch profile 380, the requestee/content provider device 313 physical addressing and MAC information, as well as a stamp providing the date, time, device, operating system, and other information specific to the device wherein the Secure Fetch profile 380 was created. The above information, along with all previously disclosed blocks (A through G) are summarized within the Secure Fetch profile 380 as block-H 366.

With continued reference to FIG. 3, the final step in the creation of a Secure Fetch profile 380 is the algorithm that encapsulates the referenced blocks of data (blocks A through J) and renders the coding into a format that can be easily managed through the host (PINApp 305) system as well as the grantee device(s) (not shown) that will be allowed access to the subject digital content file 395 managed by the Secure Fetch profile 380. The encapsulation of the Secure Fetch profile 380 is represented by block-J 385 of FIG. 3.

The process of encapsulation (block-J 385) begins when the requestor (not shown) creating the Secure Fetch profile 380 has indicated through the ARC instructions input UI 320 that the creation of the Secure Fetch profile 380 is completed. The ARC instructions input UI 320 notifies the ARC operating system 310 of the completed Secure Fetch profile 380, and the ARC operating system 310 begins the encapsulation process to create the completed profile block-J 385. Once the encapsulation process has been completed, the ARC operating system 310 notifies the ARC database 330 that the creation of the subject ARC profile 380 has been successfully completed. The ARC database 330 will store the completed Secure Fetch profile 380 as well as the encapsulation information represented as block-J 385. The ARC database 330 will store all block information (A through J) as separate components. Each encapsulation event is created using a prediction resistant algorithm to ensure the integrity of the Secure Fetch profile 380, and to ensure that hacking or otherwise breaching the Secure Fetch profile 380 to access the digital content file 395 is discouraged. The encapsulation of the Secure Fetch profile 380 (as represented by block-J 385) takes place with each newly created Secure Fetch profile, regardless of the encryption methodology (block-G 361) chosen to protect the Secure Fetch profile 380 during transit between devices, requestees, grantees, and/or networks.

As stated previously, all Secure Fetch profiles (including Secure Fetch profile 380) are stored in the ARC database 330 for retention and access through both the host system (PINApp or other host system 305) or can also be accessed from the ARC database 330 via the ARC instructions input UI 320 at any time.

Completed Secure Fetch profiles can be stored within the host system as stated above, as well as being transferred to one or more requestees for the purpose of allowing the one or more requestees to gain access to the digital content being managed through the ARC.

What is claimed is:

1. A system for obtaining digital content for one or more requestors from one or more requestees comprising:
   one or more communication devices in communication with the one or more requestees; and
   one or more host systems that:
      receive a selection of the one or more requestees;
      send to the one or more requestees one or more links to one or more user interfaces that receive digital data, wherein the digital data identifies the location of the digital content, the digital content stored on one or more client devices of the one or more requestees; and
      receive the digital data from the one or more client devices of the one or more requestees via the one or more user interfaces and the one or more communication devices;
   wherein the digital content is not uploaded to the one or more host systems and is retrieved by the one or more requestors from the one or more client devices using the location identified in the digital data;
   wherein the one or more requestors are authenticated by the one or more host systems while the selection of one or more requestees are not authenticated;
   wherein the one or more host systems receive a selection of one or more grantees, wherein the one or more grantees are not authenticated by the one or more host systems and have access to the digital data and the digital content;
   wherein the one or more grantees are provided with access to the digital content from the one or more client devices without the digital content being stored on the one or more host systems;
   wherein the one or more host systems uniquely generate the one or more user interfaces for each of the plurality of requestees.

2. The system of claim 1, wherein the one or more host systems allow only viewing access to the digital content.

3. The system of claim 1, wherein the one or more host systems store the digital content in one or more encrypted blocks on one or more storage devices.

4. The system of claim 1, wherein the access to the digital content provided to the one or more grantees expires after a predefined period of time.

5. A system for obtaining digital content for one or more requestors from one or more requestees comprising:
   one or more communication devices in communication with the one or more requestees;
   one or more host systems that:
      present one or more user interfaces that receive digital data;
      send to the one or more requestees one or more links to one or more user interfaces; and receive the digital data from the one or more requestees via the one or more user interfaces and the one or more communication devices;

wherein the digital data identifies the location of the digital content at one or more client devices belonging to the one or more requestees, the digital content stored on the one or more client devices;

wherein the digital content is retrieved from the one or more client devices by the one or more requestors using the location identified in the digital data without uploading the digital content to the one or more host systems; and wherein the one or more requestors are authenticated by the one or more host systems while the one or more requestees are not;

wherein the one or more host systems receive a selection of one or more grantees, wherein the one or more grantees are not authenticated by the one or more host systems and have access to the digital data and the digital content;

wherein the one or more grantees are provided with access to the digital content from the one or more client devices without the digital content being stored on the one or more host systems;

wherein the one or more host systems uniquely generate the one or more user interfaces for each of the plurality of requestees.

6. The system of claim 5, wherein the one or more requestors are provided with access to the digital content from the one or more client devices without the digital content being stored on the one or more host systems.

7. The system of claim 6, wherein the access to the digital content provided to the one or more requestors expires after a predefined period of time.

8. The system of claim 5, wherein the one or more requestors are notified with a predefined message when the digital content is received from the one or more requestees.

9. A computer-implemented method for obtaining digital content for one or more requestors from one or more requestees, the method comprising:

presenting one or more user interfaces that receive digital data, the digital data identifying the location of digital content stored on one or more client devices of the one or more requestees;

sending to the plurality of requestees one or more links to the one or more user interfaces;

receiving the digital data from the one or more requestees at one or more host systems via the one or more user interfaces; and providing access to the digital content at the one or more clients, wherein the digital content is retrieved from the one or more client devices by the one or more requestors using the location identified in the digital data and without uploading the digital content to the one or more host systems;

wherein the one or more requestors are authenticated by the one or more host systems while the one or more requestees are not;

wherein the one or more host systems receive a selection of one or more grantees, wherein the one or more grantees are not authenticated by the one or more host systems and have access to the digital data and the digital content;

wherein the one or more grantees are provided with access to the digital content from the one or more client devices without the digital content being stored on the one or more host systems;

wherein the one or more host systems uniquely generate the one or more user interfaces for each of the plurality of requestees.

10. The computer-implemented method of claim 9, wherein access to the digital content is provided for viewing only.

11. The computer-implemented method of claim 9, wherein the one or more links expire after a predefined period of time.

12. The computer-implemented method of claim 9, wherein the digital content is stored in one or more encrypted blocks on one or more storage devices.

* * * * *